(12) United States Patent
Hitchcock (10) Patent No.: US 8,931,011 B1
(45) Date of Patent: Jan. 6, 2015

(54) SYSTEMS AND METHODS FOR STREAMING MEDIA CONTENT

(75) Inventor: Daniel W. Hitchcock, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/418,568

(22) Filed: Mar. 13, 2012

(51) Int. Cl.
*H04N 5/445* (2011.01)
*H04N 7/173* (2011.01)

(52) U.S. Cl.
USPC .......................................... 725/52; 725/105

(58) Field of Classification Search
USPC .................................................. 725/52, 105
See application file for complete search history.

(56) References Cited

U.S. PATENT DOCUMENTS

| | | | |
|---|---|---|---|
| 7,865,306 B2* | 1/2011 | Mays | 701/437 |
| 8,433,136 B2* | 4/2013 | Epshtein et al. | 382/176 |
| 2004/0220965 A1* | 11/2004 | Harville et al. | 707/104.1 |
| 2008/0066103 A1* | 3/2008 | Ellis et al. | 725/38 |
| 2008/0307311 A1* | 12/2008 | Eyal | 715/733 |
| 2011/0102637 A1* | 5/2011 | Lasseson | 348/239 |
| 2013/0166998 A1* | 6/2013 | Sutherland | 715/202 |
| 2013/0188923 A1* | 7/2013 | Hartley et al. | 386/241 |

* cited by examiner

*Primary Examiner* — Pankaj J Kumar
*Assistant Examiner* — Franklin Andramuno
(74) *Attorney, Agent, or Firm* — Thomas | Horstemeyer, LLP (57) ABSTRACT

Disclosed are various embodiments for facilitating streaming of media content. Video content is retrieved over a network from one or more client devices capturing video content. Data items associated with the plurality of video content are also retrieved. A list order for the plurality of video content is determined according to at least a portion of the retrieved data items, and a user interface is encoded for display where the user interface contains a plurality of items corresponding to the plurality of video content, the items being positioned within the user interface according to the list order.

23 Claims, 10 Drawing Sheets

SYSTEMS AND METHODS FOR STREAMING MEDIA CONTENT

BACKGROUND

As smartphones and other devices capable of capturing audio/video content have become ubiquitous, it is common for people to capture media content for others to later view via the Internet given the availability of network connectivity for computing devices. As such, video content is widely available to be downloaded for viewing purposes. Users may, for example, select media titles by browsing an electronic publisher's network site. Conventional download systems allow users to select media content of interest after the media content has been captured and stored.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to systems and methods for allowing streaming of media content including, for example, location-tagged video, whereby users may consume the streaming media content in real-time or substantially in real-time. Users of the service provide media content by executing an application and utilizing their media capture device. The captured media content may then be consumed in any number of relevant contexts via a web browser or application, thereby providing viewers with a means to view global events in real-time.

Disclosed are various embodiments for facilitating streaming of media content. Video content and associated data items are retrieved over a network from one or more client devices capturing video content. A list order for the plurality of video content is determined according to at least a portion of the retrieved data items, and a user interface is encoded for display where the user interface contains a plurality of items corresponding to the plurality of video content, the items being positioned within the user interface according to the list order.

In accordance with some embodiments, users may retrieve media content by navigating a user interface embodied as a map, where viewers may zoom in to expand one or more regions of interest. Viewers may then select media content based on such criteria as event descriptions, video quality, location where the media content is being originated, and so on. For some embodiments, viewers may retrieve media content streams marked "public" as well as streams provided by their social networking connections (e.g., friends, family). Furthermore, media content such as video streams of a particular event may be created from multiple vantage points, thereby providing viewers with various viewing options. In the following discussion, a general description of the system and its components is provided, followed by a discussion of the operation of the same.

Figure 1:
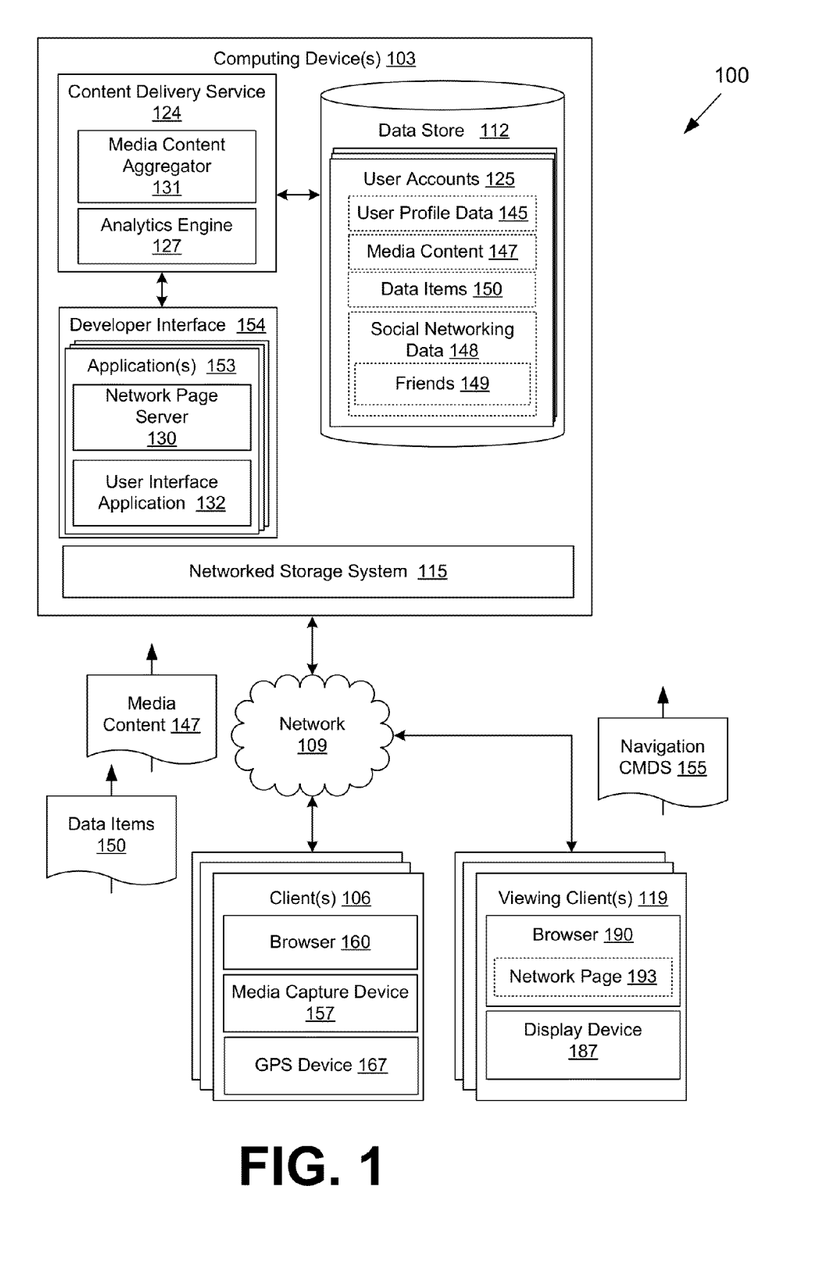
FIG. 1 is a drawing of a networked environment for facilitating media content streaming according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103 include, for example, a networked storage system 115 and a content delivery service 124 that includes such platform level components as a media content aggregator 131 and an analytics engine 127. The components executed in the computing device 103 may further include a developer interface 154 that includes such application level components as a network page server 130 and a user interface application 132 implemented in one or more customized applications 153. The computing device 103 may include other applications, services, processes, systems, engines, or functionality not discussed in detail herein.

The content delivery service 124 is executed to facilitate the transmission of media content captured by one or more clients 106 and to facilitate electronic communications with one or more viewing clients 119 where such electronic communications may be generated and transmitted via the network 109. The media content aggregator 131 in the content delivery service 124 retrieves media content 147 being captured in real-time or substantially in real-time by one or more clients 106 and may temporarily buffer the uploaded media content 147 in the data store 112 before streaming the captured media content 147 to a viewing client 119.

The analytics engine 127 is executed to analyze data items 150 uploaded in conjunction with media content 147 from one or more clients 106 and prioritize the uploaded media content 147 according to one or more criteria, which may be, for example, specified by the user of a viewing client 119. Based on the prioritized list of media content 147, the user interface application 132 encodes a user interface for display that allows a user of a viewing client 119 to navigate and select media content for consumption. A user capturing media content 147 may wish to limit viewing of the media content 147 to certain individuals such as friends and family of the user. Thus, for some embodiments, the user interface application 132 may also be executed to generate recommendations or invitations embodied as electronic communications for purposes of facilitating media content streaming to one or more viewing clients 119.

The developer interface 154 is executed to provide third-party (as well as first-person) developers with a programming interface for developing applications 153 for allowing viewing clients 119 to access media content 147 provided by the content delivery service 124. Third-party developers and other entities may utilize the developer interface 154 to facilitate access to media content 147 by way of more of more application programming interfaces (APIs) provided by the developer interface 154. Through the development platform provided by the developer interface 154, third-party developers may provide customized applications for accessing and consuming captured media content 147 by utilizing such features as those provided by the content delivery service 124.

In this regard, third-party developers associated with, for example, news outlets/organizations, video sharing entities, social media outlets, etc. may leverage features offered by the content delivery service 124 and build customized applications for providing a branded experience relating to surfacing of media content 147 to viewing clients 119. At the same time, third-party developers may utilize the developer interface 154 to restrict access to the captured media content 147 via, for example, a paywall or some other mechanism.

Developers interact with the developer interface 154 executing in the computing device 103 to develop applications 153 that may generate, for example, user interfaces encoded for display on viewing clients 119 for purposes of accessing captured media content 147. In the following discussion, a general description of the system and its components is provided, followed by a discussion of the operation of the same. The developer interface 154 may include a commercially available hypertext transfer protocol (HTTP) server such as, for example, Apache® HTTP Server, Apache® Tomcat®, Microsoft® Internet Information Services (IIS), and so on.

The network page server 130 in an application 153 within the developer interface 154 is executed to facilitate the online streaming of media content 147 over the network 109 based on, for example, recommendations/invitations transmitted to individuals. As an example, the network page server 130 may encode network pages 193 or portions thereof that are rendered for display by one or more viewing clients 119. According to various embodiments, the content delivery service 124 is configured to generate user interfaces and/or recommendations/invitations for consuming media content 147 via the network 109. Various mechanisms may be employed by the content delivery service 124 to generate a listing of media content 147 for consumption, where viewers are provided an opportunity to sort and prioritize media content 147 before making one or more selections.

The networked storage system 115 is executed to maintain a file hierarchy of files and folders in networked or metadata-based file systems for users. The networked storage system 115 may be regarded as maintaining a file system for each of the users of the system. To this end, the networked storage system 115 may support various file-related operations such as, for example, creating files, deleting files, modifying files, setting permissions for files, downloading files, and/or other operations. The networked storage system 115 may be configured to maintain a record of file activity, e.g., uploading of files, downloading of files, deletion of files, previewing of files, etc. The networked storage system 115 may be configured to serve up data addressed by uniform resource locator (URL) via hypertext transfer protocol (HTTP).

In some embodiments, the networked storage system 115 may correspond to a virtual file system where the actual data objects of the files are stored in a separate data storage system. A metadata service may be used to associate metadata with the files, thereby facilitating searches of the files using the metadata. By storing files in such a networked storage system 115, users may access the files from any client 106 with connectivity to the network 109.

A metadata service may be executed in association with or as part of the networked storage system 115 to maintain metadata items in association with files. To this end, such a metadata service may support various operations such as, for example, creating metadata items, deleting metadata items, retrieving metadata items, searching on metadata items, and/or other operations. The metadata service may also implement one or more searchable indices of the metadata items. It is noted that the networked file system associated with each user storage account in the networked storage system 115 may be a metadata-based file system such as that described by U.S. patent application Ser. No. 13/036,539 entitled "METADATA-BASED FILE SYSTEM," which was filed on Feb. 28, 2011 and is incorporated herein by reference in its entirety.

The data stored in the data store 112 may include one or more user accounts 125. Associated with each user account 125, for example, is various data associated with a respective user such as user profile data 145, and social networking data 148. The data store 112 may also include captured media content 147 uploaded to the computing device 103 from one or more clients 106, one or more data items 150 associated with the media content 147, among other types of data associated with a respective user.

The one or more data items 150 may include, for example, extrinsic data items that are not obtained directly from video content features of the media content 147. In other words, the extrinsic data items may be obtained from an external source. This is in contrast to intrinsic data, which may be obtained from the video or audio of video content features. Non-limiting examples of the extrinsic data items may include names or descriptions of individuals in the captured media content 147. The extrinsic data items may include curated data that is professionally managed, verified, or is otherwise trustworthy.

Stored with the extrinsic data items may be date-time associations, which are user-generated associations between extrinsic data items and specific times in the capturing of a video content feature. For some embodiments, the analytics engine 127 in the computing device 103 may be executed to extract intrinsic data from media content 147 uploaded from a client 106, where the intrinsic data may comprise such information as a number of faces detected within the media content 147.

The data store 112 also includes social networking data 148 that may comprise, for example, a listing of friends 149 of the user currently capturing media content 147. Such friends 149 may comprise individuals with whom the user shares an interpersonal connection such as friendship, spousal relationships, being related by blood relationship, and other types of interpersonal connections. The social networking data 148 may contain such information as demographic information, occupation, interests, and so on.

The social networking data 148 may further comprise profile data associated with one or more social networks that are frequented by users associated with the user accounts 125. Non-limiting examples of social networks include Facebook®, Twitter®, MySpace®, and others. The friends 149 include those individuals who may or may not hold their own user account 125 with whom a given user has an interpersonal relationship. The friends 149 may be identified by interfacing with a given social network such as Facebook®, Twitter®, MySpace®, and others.

Such social network sites may specify Applications Programming Interfaces (APIs) to which the content delivery service 124 may send an API call to request information about the friends of a user on such social networks. Alternatively, one or more user interfaces may be generated in the form of network pages 193 or other content that facilitate a user specification of their friends 149 by facilitating a search for such individuals in the user accounts 125.

Assuming a listing of friends 149 is obtained from a third party social networking site, the content delivery service 124 may also employ various approaches to associating previously existing user accounts 125 with the friends 149 discovered for a given user. To this end, a user account 125 may be confirmed to belong to a friend 149 of a given user by sending further API calls to the social networking site to verify that the user account correlates to a friend 149 of the respective user on the social networking site. This may especially be necessary where a friend of an individual has a common name.

The user profile data 145 may include information about users with which the file systems in the networked storage system 115 are associated. The user profile data 145 may also include information about user accounts 125 with an electronic commerce system. Such information may comprise, for example, name, shipping address, payment instruments, and other information. Account settings may be employed to specify and track various settings and other functionality with respect to a given account such as passwords, security credentials, file management permissions, storage quotas and limitations, authorized access applications, billing information, and/or other data.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display, where the display may comprise, for example, one or more devices such as cathode ray tubes (CRTs), liquid crystal display (LCD) screens, gas plasma-based flat panel displays, LCD projectors, or other types of display devices, etc. The client 106 may further comprise a global positioning system (GPS) device 167 configured to determine a current location of the client 106. Such GPS location data may then be uploaded in conjunction with captured media content 147 to the computing device 103.

The client 106 may be configured to execute various applications such as a browser 160 and/or other applications. The browser 160 may be executed in a client 106, for example, to access and render network pages, such as web pages, or other network content served up by the computing device 103 and/or other servers, thereby rendering a network page on the display. The client 106 may further comprise a media capture device 157 such as a digital camera capable of capturing both digital images and video content, where the media capture device 157 also includes an integrated microphone for capturing audio content. As shown, the client 106 uploads captured media content 147 and corresponding data items 150 via the network 109 to the computing device 103, where the content delivery service 124 then streams the media content 147 to one or more viewing clients 119 for consumption.

The viewing client 119 is representative of a plurality of client devices that may be coupled to the network 109. The viewing client 119 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The viewing client 119 may include a display 187, where the display 187 may comprise, for example, one or more devices such as cathode ray tubes (CRTs), liquid crystal display (LCD) screens, gas plasma-based flat panel displays, LCD projectors, or other types of display devices, etc.

The viewing client 119 may be configured to execute various applications such as a browser 190 and/or other applications. The browser 190 may be executed in a viewing client 119, for example, to access and render network pages, such as web pages, or other network content served up by the computing device 103 and/or other servers, thereby rendering a network page 193 on the display 187. The network page 193 may comprise, for example, user interfaces for navigating and selecting media content 147 for consumption where items corresponding to media content 147 uploaded by the client 106 may be sorted or prioritized in the user interfaces. The viewing client 119 may be configured to execute applications beyond the browser 190 such as, for example, email applications, instant message applications, and/or other applications.

Next, a general description of the operation of the various components of the content delivery service 124 is provided. To begin, a developer creates an application 153 configured to allow users of viewing clients 119 to access and consume media content 147 captured by one or more clients 106. The developer may transfer the application 153 to the computing device 103 by way of the developer interface 154, where the application may incorporate platform level features provided by the content delivery service 124. For some embodiments, the developer may provide one or more groupings, by way of an application programming interface (API), various captured media content 147 to the viewing clients 119 where the one or more groupings may be displayed in a user interface embodied, for example, as a map. Additionally, the developer may specify what sorting criteria is to be applied to the grouping. Alternatively, the developer may allow the viewing clients 119 to specify the sorting criteria. Various applications 153 and/or other functionality implemented by third-party developers may be executed in the computing device 103 according to various embodiments One or more clients 106 capture media content 147 via media capture devices 157. Note that some clients 106 may be co-located where the corresponding users are attending a common event, while other clients 106 may be geographically dispersed and located in other locations. While the client 106 captures media content 147, data items 150 corresponding to the media content 147 may be generated, where the data items 150 may include, for example, GPS location data, directional data (e.g., a camera is pointed in a northerly direction), video resolution, audio quality, a user identifier, temporal data such as a time-date stamp, and so on, or environmental data (e.g., altitude, temperature, or humidity). The user identifier may be used, for example, for accessing a corresponding user account 125 and retrieving user profile data 145 from the data store 112 in the computing device 103.

The media content aggregator 131 retrieves the media content 147 and one or more data items 150 uploaded by the client 106 and may temporarily buffer the media content 147 and data items 150 in the data store 112 before streaming the media content 147 to a viewing client 119 via the network 109. For some embodiments, the user interface application 132 in the developer interface 154 may be executed to generate a user interface embodied as a map that identifies the locations of clients 106 currently uploading media content 147, where items corresponding to captured media content 147 are presented on the map according to location associated with the media content 147. Users of viewing clients 119 may then navigate the map to zoom in to regions of interest. Users of the viewing clients 119 may also specify criteria for purposes of sorting uploaded media content 147. For some embodiments, the sorting criteria may be derived based on data items 150 uploaded by one or more clients 106, where the data items 150 may comprise such information as location information, video resolution of captured video, audio quality, a user identifier, an event description, and so on.

For scenarios where users of the viewing clients 119 specify criteria for purposes of sorting uploaded media content 147, the analytics engine 127 analyzes the data item of other media content 147 uploaded by other clients 106 and sorts the uploaded content 147 accordingly. For example, where a user of a viewing client 119 wishes to sort uploaded content according to video resolution, the analytics engine 127 may sort the media content 147 such that high-resolution video is prioritized.

In accordance with some embodiments, a user of a client 106 may wish to notify friends, family members, etc. that the user is currently capturing media content 147. The user may wish to invite others to view the captured media content 147 in real time. For such embodiments, the content delivery service 124 may be executed to generate a recommendation or invitation to users of viewing clients 119 to invite them to view the captured media content 147. For some embodiments, the user of a client 106 may wish to send an invitation to friends 149 specified in the social networking data 148 in the data store 112. The content delivery service 124 may facilitate communication with an application programming interface provided by a third party system, such as a social networking site (e.g., Facebook®, Twitter®, MySpace®, Linkedin®), microblogging system, or any other system or site in which social networking data of users is accessible by the computing device 103. The content delivery service 124 may periodically retrieve social networking data 148 from third party systems and store the retrieved data in the data store 112. The social networking data 148 may include, for example, a listing of friends 149 of the user. Such friends 149 may comprise individuals with whom a user shares an interpersonal connection such as friendship, spousal relationships, being related by blood relationship, and other types of interpersonal connections.

As shown, the viewing client 119 may transmit navigation commands 155 to the computing device 103, which may then forward the navigation commands 155 to the client 106 that is currently capturing media content 147 to perform zooming and/or panning operations. In some scenarios, it is possible that users of different viewing clients 119 may send conflicting navigation commands 155 (e.g., where one viewer wishes to zoom in while another viewer wishes to zoom out). In such scenarios, the content delivery service 124 may forward a navigation command(s) 131 to the client 106 based on the number of requests. For example, the content delivery service 124 may instruct the client 106 to zoom in upon receiving a larger number of requests to zoom in.

When embedded in network pages 193, the user interfaces provided to viewing clients 119 may include such recommendation source data as hypertext markup language (HTML), extensible markup language (XML), extensible HTML (XHTML), mathematical markup language (MathML), scalable vector graphics (SVG), cascading style sheets (CSS), images, audio, video, graphics, text, and/or any other data that may be used in serving up or generating a list of media content 147 for consumption.

Figure 2:
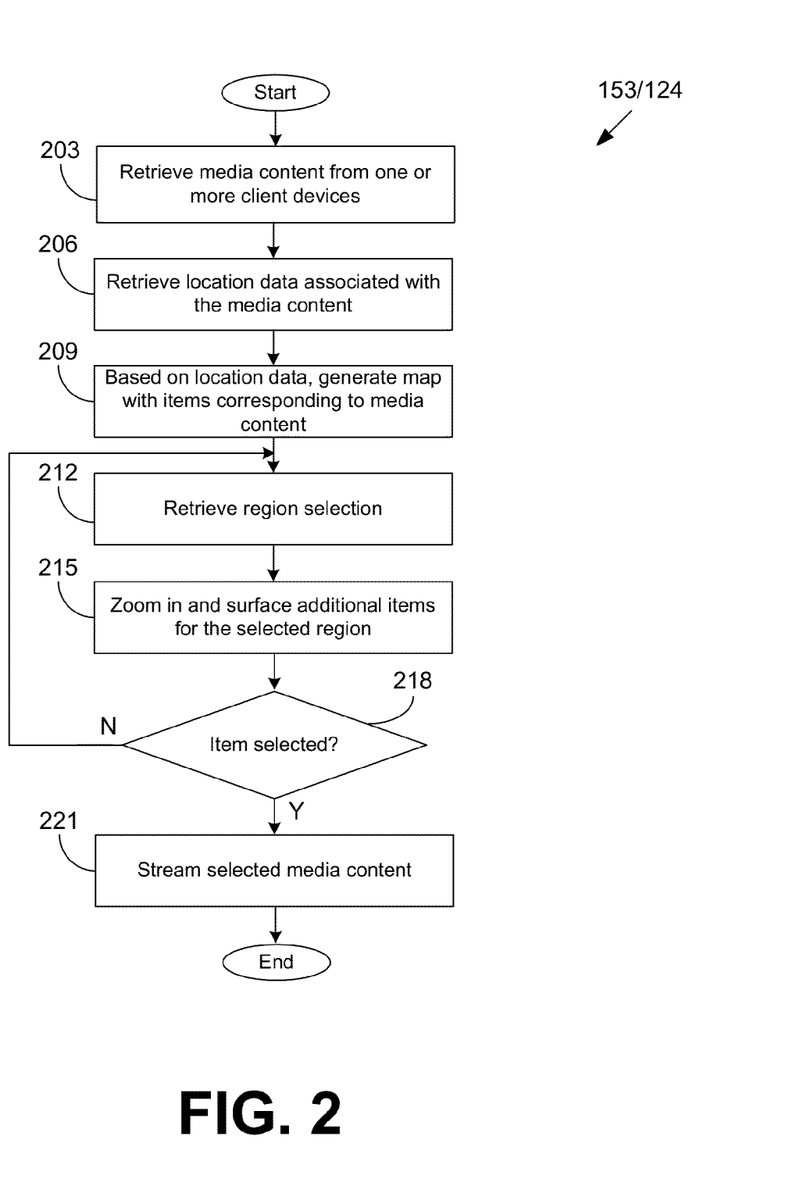
FIG. 2 is a flowchart that provides various examples of the operation of an application and the content delivery service in FIG. 1 according to various embodiments of the present disclosure.

Referring next to FIG. 2, shown is a flowchart that provides one example of the operation of an application 153 (FIG. 1) and the content delivery service 124 (FIG. 1) according to various embodiments for facilitating streaming of media content 147. It is understood that the flowchart of FIG. 2 provides merely an example of the many different types of functional arrangements that may be employed to implement the operation of the portion of an application and the content delivery service 124 as described herein. As an alternative, the flowchart of FIG. 2 may be viewed as depicting an example of steps of a method implemented in the computing device 103 (FIG. 1) according to one or more embodiments. The content delivery service 124 is executed in the computing device 103 and interfaces with the client 106 (FIG. 1) and viewing client 119 (FIG. 1) over the network 109 (FIG. 1).

Beginning with box 203, the media content aggregator 131 (FIG. 1) in the content delivery service 124 retrieves media content 147 (FIG. 1) from a client 106 capturing media content 147 via a media capture device 157 (FIG. 1), where the captured media content 147 is retrieved via the network 109 (FIG. 1).

In box 206, the media content aggregator 131 retrieves one or more data items 150 (FIG. 1) corresponding to the captured media content 147 from the client 106, where one of the data items 150 may comprise location data in the form of GPS coordinates. Alternatively, the location data may comprise a descriptor or tag generated by the user of the client 106 (e.g., "skiing in Colorado").

In box 209, the user interface application 132 (FIG. 1) in an application 153 encodes a user interface for display at a viewing client 119, where the user interface may be embodied, for example, as a map. For some embodiments, the map may include items corresponding to the captured media content 147, where the items are presented on the map based on the location data associated with the media content 147. A user of a viewing client 119 may navigate the map to identify a region of interest. In box 212, the content delivery service 124 retrieves a region selection from a user of a viewing client 119. In box 215, the user interface application 132 zooms into the map to surface additional items for the selected region.

In box 218, a determination is made by the application 153 on whether the user has selected an item corresponding to captured media content 147. If not, the application 153 returns to box 212 and retrieves another region of interest. Based on this, the user interface application 132 zooms in to a new region or zooms in further into the current region, thereby allowing the user to further navigate the map to identify media content 147 to view. Returning to box 218, if the user selects an item, then in box 221, the media content 147 corresponding to the selected item is transmitted by the content delivery service 124 over the network 109 (FIG. 1) to the viewing client 119 making the selection.

Figure 3:
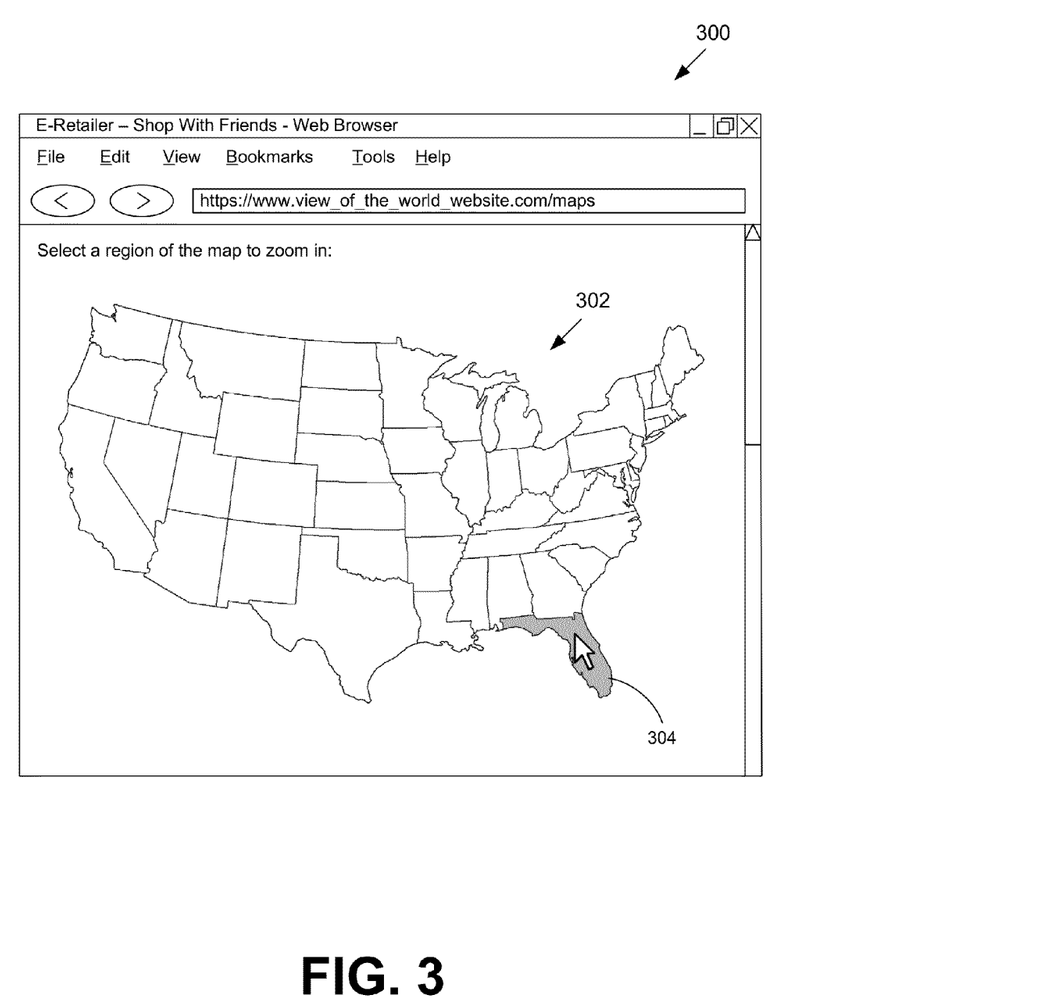
FIG. 3 is an example user interfaces depicting electronic communications for navigating a user interface embodied as a map for purposes of selecting media content for consumption according to various embodiments of the present disclosure.
Figure 4:
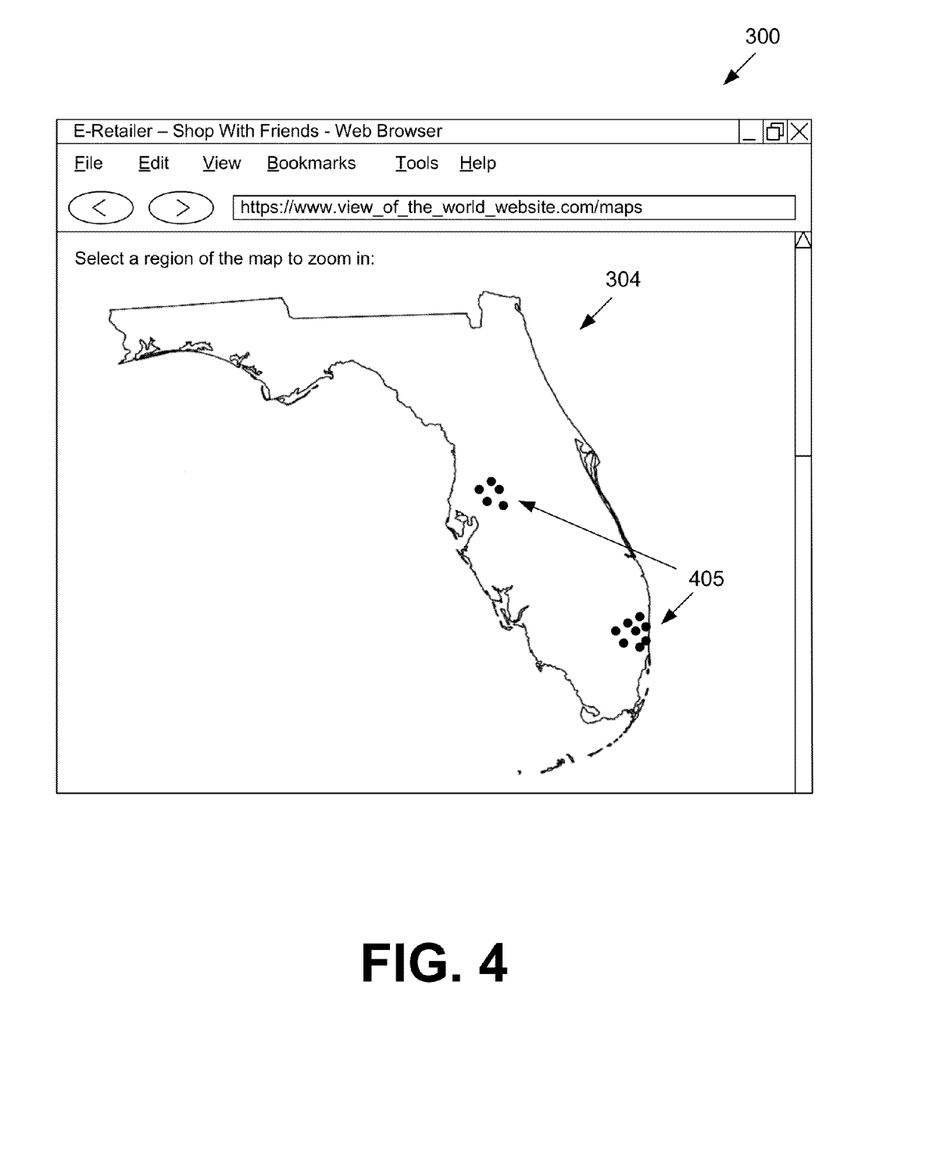
FIG. 4 is an exploded view of the map in FIG. 3 for purposes of selecting media content for consumption according to various embodiments of the present disclosure.

In the examples that follow, the application 153 (FIG. 1) provides various interfaces for selecting various media content streams 147 for presentation to viewing clients 119. Shown in FIG. 3 and FIG. 4 are examples of a user interface 300 encoded by an application 153 developed by a third-party (e.g., a news outlet, video sharing entity, social media outlet) the developer interface 154 (FIG. 1), where the user interface 300 is rendered for display by a viewing client 119 (FIG. 1) in the networked environment 100 (FIG. 1) for facilitating media consumption. Specifically, FIG. 3 and FIG. 4 depict a rendered network page 193 (FIG. 1) with a user interface 300 that allows a user to select media content 147 (FIG. 1) uploaded by a client 106 (FIG. 1). In the example shown in FIG. 3, the user interface 300 provides a map 302 and prompts the user to select a region 304 of interest to zoom in to for purposes of narrowing down a list of possible media content 147 to view. In the example shown, the highlighted region 304 represents the region selected by the user of a viewing client 119 using, for example, a mouse or other means (e.g., a touchscreen interface).

FIG. 4 shows the user interface 300 whereby an exploded view of the selected region 304 is provided. For some embodiments, the content delivery service 124 retrieves location data (e.g., GPS coordinates) from the data items 150 (FIG. 1) uploaded by one or more clients 106. The items 405 shown in the user interface 300 represent the locations of clients 106 currently capturing media content 147. At this point, the user of the viewing client 119 may elect to zoom in to the map further or select one of the items 405 shown in order to view the media content 147 being captured by the client 106. The items 405 may be selectable so as to launch a corresponding viewing pane that displays the selected media content 147. For some embodiments, the items 405 may comprise thumbnails with representative images from the respective captured media content 147. Furthermore, descriptions of the captured media content 147 may also provided in conjunction with the items 405. For example, a brief description of an event being videoed may be provided (e.g., "snowboarding in Colorado").

Figure 5:
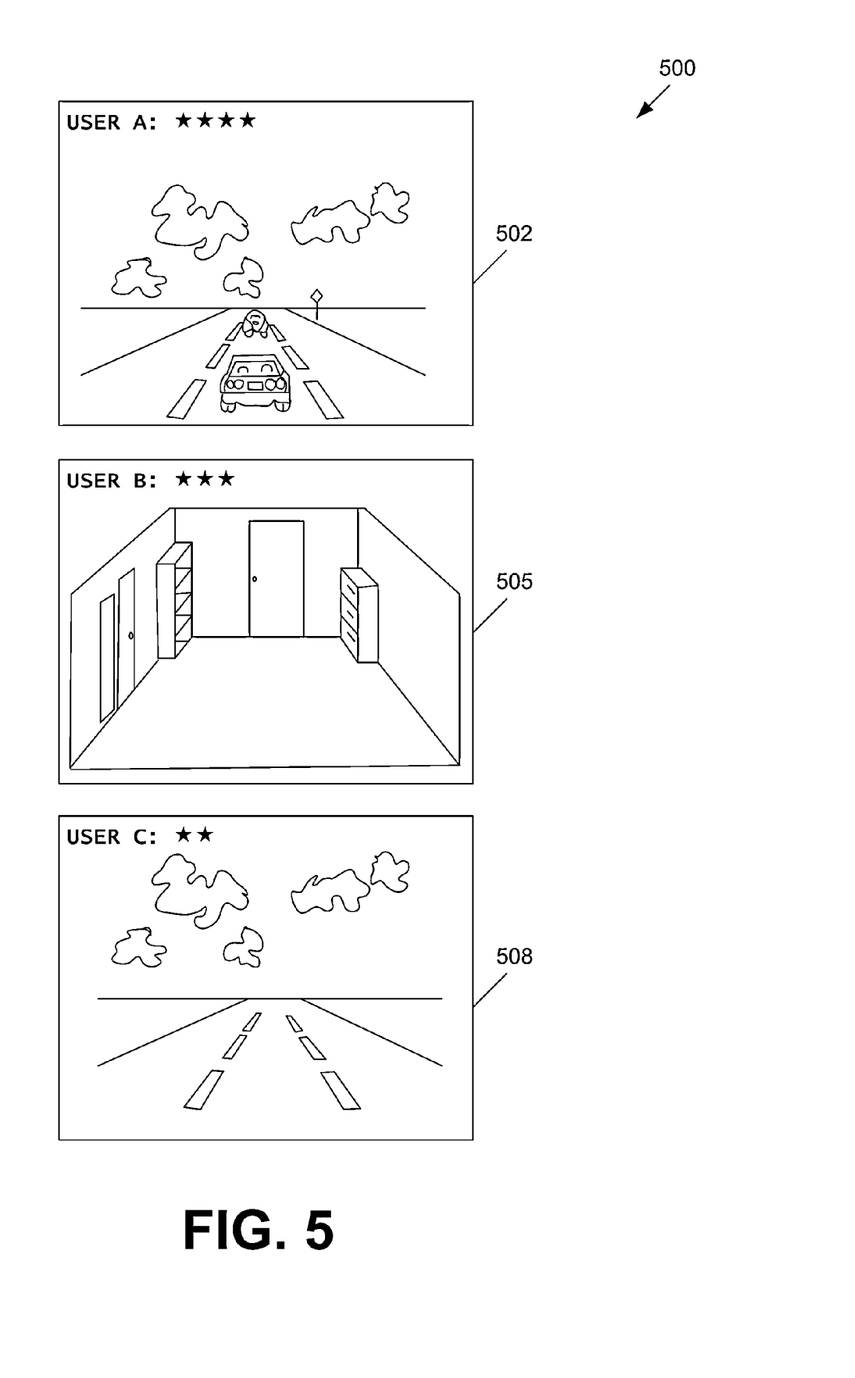
FIG. 5 is an example user interfaces depicting electronic communications for navigating a user interface, where the media content is sorted according to a user rating according to various embodiments of the present disclosure.

Shown in FIG. 5 is another example of a user interface 500 encoded by an application 153 (FIG. 1) developed by a third-party via the developer interface 154 (FIG. 1) where the user interface 500 is rendered for display by a viewing client 119 (FIG. 1) in the networked environment 100 (FIG. 1) for facilitating media consumption. Specifically, the user interface 500 in FIG. 5 may be embodied as a rendered network page 193 (FIG. 1) that allows a user to select media content 147 (FIG. 1) uploaded by a client 106 (FIG. 1). In this example, the user interface 500 provides multiple video streams that have been sorted according to one or more data items 150 (FIG. 1) uploaded by a client 106.

For illustration purposes, the user interface 500 shows three video streams 502, 505, 508 being displayed on viewing panes, where the video streams 502, 505, 508 have been sorted based on the users who are capturing the media content 147 and based on their corresponding ratings. In some cases, the ratings may have been assigned by past viewers of media content 147 uploaded by the users. In the example shown, User A has the highest rating (four stars) and is therefore listed first, while User C has the lowest rating (two stars) and is listed last. The identity of the user in addition to the user's corresponding rating may be contained in the uploaded data items 150. Alternatively, the ratings may be stored in the data store 112 (FIG. 1) as part of the user profile data 145 (FIG. 1) and retrieved by the content delivery service 124 upon retrieving the identity of the user.

Figure 6:
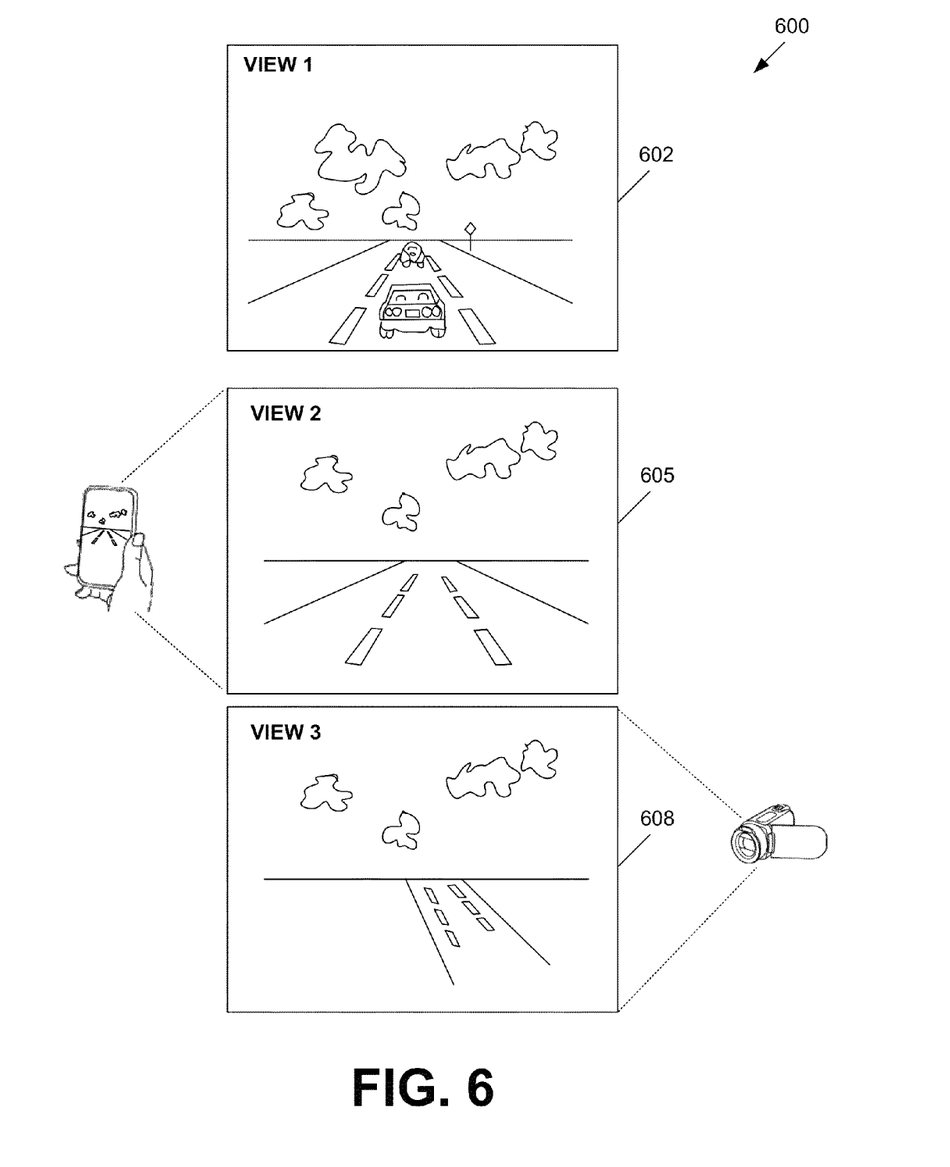
FIG. 6 is an example user interfaces depicting electronic communications for navigating a user interface, where the media content is sorted according to a viewing angle according to various embodiments of the present disclosure.

Shown in FIG. 6 is yet another example of a user interface 600 encoded by an application 153 (FIG. 1) developed by a third-party developer via the developer interface 154 (FIG. 1) where the user interface 600 is rendered for display by a viewing client 119 (FIG. 1) in the networked environment 100 (FIG. 1) for facilitating media consumption. Specifically, FIG. 6 depicts a rendered network page 193 (FIG. 1) with a user interface 600 that allows a user to select media content 147 (FIG. 1) uploaded by a client 106 (FIG. 1). In this example, the user interface 600 again provides multiple video streams 602, 605, 608 displayed in viewing panes, where the video streams 602, 605, 608 that have been sorted according to one or more data items 150 (FIG. 1) uploaded by a client 106. For illustration purposes, the user interface 600 shows three video streams 602, 605, 608, where the video streams 602, 605, 608 have been sorted based on a particular vantage point of a common event. In some cases, multiple users may be attending the same event (e.g., a race car competition), where the users may all be capturing live video of the event.

In accordance with some embodiments, the user of a viewing client 119 (FIG. 1) may elect to sort the captured media content 147 according to a particular view. In the non-limiting example, three viewing angles (View 1, View 2, View 3) are available for a viewer to select from. For some embodiments, the viewer may specify that captured media content 147 be sorted according to media content 147 corresponding to View 1, followed by media content 147 corresponding to View 2, followed by media content 147 corresponding to View 3.

Figure 7:
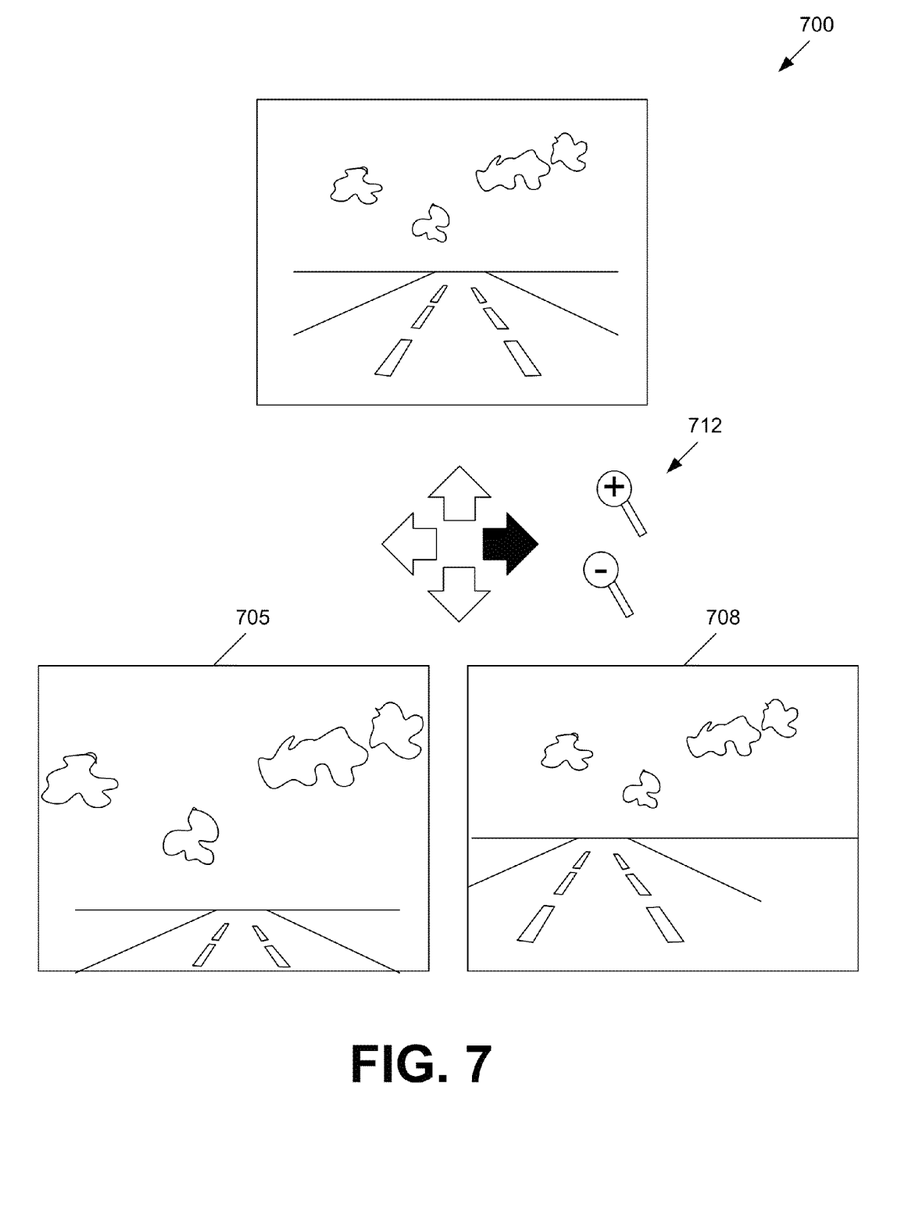
FIG. 7 is an example user interfaces depicting an electronic communication for adjusting the capture of media content according to various embodiments of the present disclosure.

Shown in FIG. 7 is yet another example of a user interface 700 encoded by an application 153 (FIG. 1) developed by a third-party developer via the developer interface 154 (FIG. 1) and rendered for display by a viewing client 119 (FIG. 1) in the networked environment 100 (FIG. 1) for facilitating media consumption. Specifically, FIG. 7 depicts a rendered network page 193 (FIG. 1) with a user interface 700 that allows a user to select media content 147 uploaded by a client 106 (FIG. 1). In this example, the user interface 700 includes a series of toolbar components 712 that allow viewers to control or influence how the media content 147 is being captured by the client 106. For example, viewers may utilize the toolbar components 712 to request that the user of the client 106 perform panning operations to the right, as shown in viewing pane 708. Alternatively, viewers may also request the user of the client 106 to zoom in, as shown in view pan 705.

The navigation requests generated by manipulation of the toolbar components 712 may be embodied as navigation commands 155 (FIG. 1) sent by a viewing client 119 to the computing device 103 (FIG. 1), which may collect navigation requests from other viewing clients 119. As discussed earlier, in some scenarios, it is possible that users of different viewing clients 119 may send conflicting navigation commands 155 (e.g., where one viewer wishes to zoom in while another viewer wishes to zoom out). In such scenarios, the content delivery service 124 may forward a navigation command(s) 131 to the client 106 based on the number of requests. For example, the content delivery service 124 may instruct the client 106 to zoom in upon receiving a larger number of requests to zoom in.

For some embodiments, users of clients 106 currently capturing media content 147 may wish to limit those who are able to view the media content 147. For example, a user may wish to allow only friends and family to view a video stream being uploaded by the user. For such embodiments, the content delivery service 124 may transmit a recommendation/invitation embodied as an electronic communication to friends and family, who may then view the captured media content 147 at their respective viewing clients 119 (FIG. 1).

Figure 8:
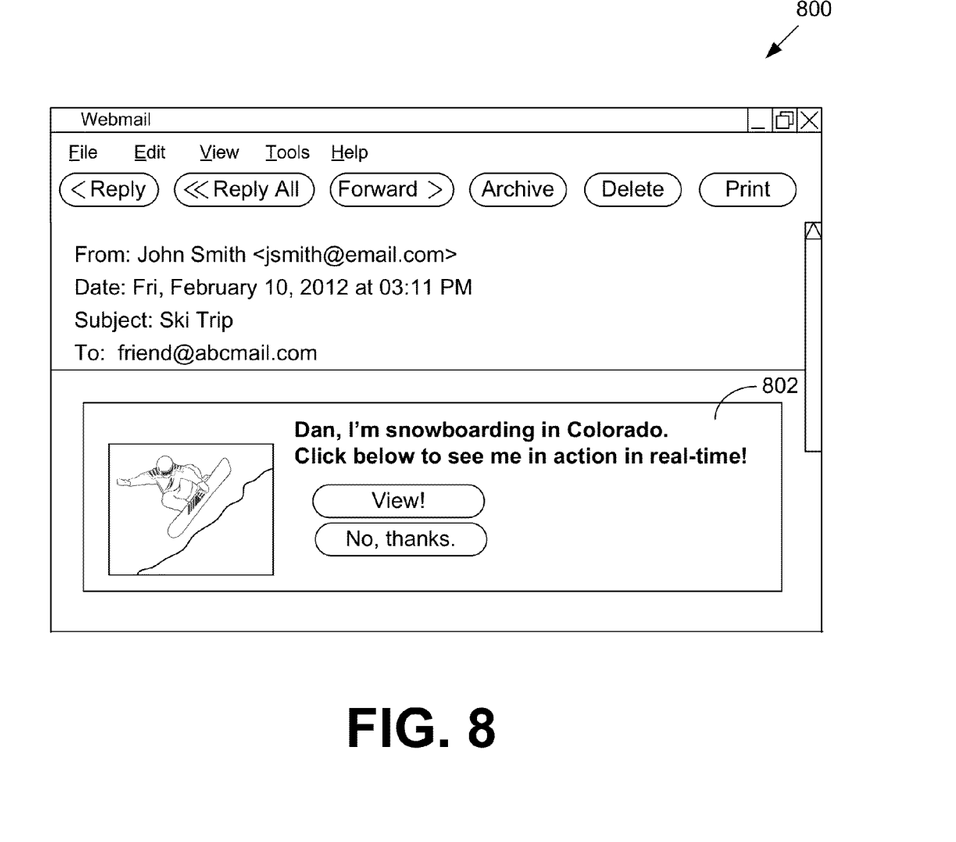
FIG. 8 is an example user interfaces depicting an electronic communication for inviting viewers to access captured media content according to various embodiments of the present disclosure.

Shown in FIG. 8 is an example of a recommendation/invitation 800 encoded by an application 153 (FIG. 1) developed by a third-party developer via the developer interface 154 (FIG. 1) and rendered for display by a viewing client 119 (FIG. 1) in the networked environment 100 (FIG. 1) for facilitating media consumption. Specifically, FIG. 8 depicts an e-mail that includes a message 802 with a selection component for viewing the video and a thumbnail with a representative image from the respective captured media content 147 (FIG. 1). In the non-limiting example shown, the user of a client 106 (FIG. 1) (in this example, John) is inviting a friend (Dan) to view live video of the user taking part in an activity (i.e., snowboarding in Colorado). Dan may elect to accept the invitation to view John's live video feed by clicking on the selection component shown. Note that the recommendation/invitation 800 may also be embodied in the form of one or more network pages 193 (FIG. 1) or other electronic communication (e.g., short message service (SMS) text messages). For example, users may also provide a posting on a social networking website alerting friends that a live video feed is available. In this regard, users of clients 106 capturing media content 147 may limit viewing to a community of individuals (e.g., friends and family) specified, for example, in the social networking data 148 (FIG. 1) in the data store 112 (FIG. 1).

Figure 9:
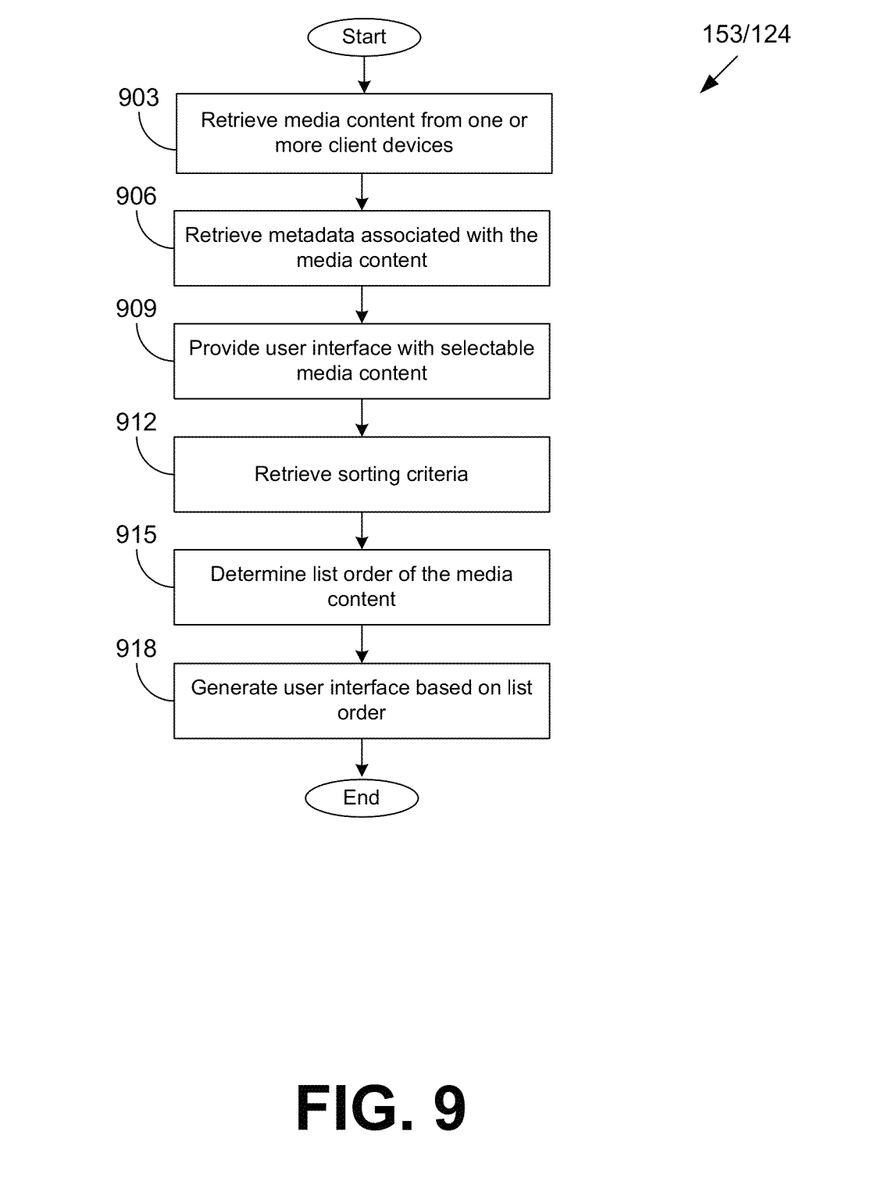
FIG. 9 is a flowchart that provides other examples of the operation of an application and the content delivery service in FIG. 1 according to various embodiments of the present disclosure.

Shown in FIG. 9 is a flowchart that provides another example of the operation of an application 153 (FIG. 1) and the content delivery service 124 (FIG. 1) according to various embodiments for facilitating streaming of media content. It is understood that the flowchart of FIG. 9 provides merely an example of the many different types of functional arrangements that may be employed to implement the operation of the portion of an application 153 and the content delivery service 124 as described herein. As an alternative, the flowchart of FIG. 9 may be viewed as depicting an example of steps of a method implemented in the computing device 103 (FIG. 1) according to one or more embodiments. The content delivery service 124 is executed in the computing device 103 and interfaces with the client 106 (FIG. 1) and viewing client 119 (FIG. 1) over the network 109 (FIG. 1).

Beginning with box 903, the media content aggregator 131 (FIG. 1) retrieves media content 147 (FIG. 1) from one or more client devices 106. In box 906, the media content aggregator 131 retrieves one or more data items 150 (FIG. 1) associated with the retrieved media content 147. The one or more data items 150 may comprise such information as location data, video resolution, audio quality, a user identifier, date-time data, an event description, and so on. Note that the one or more data items 150 may be automatically generated by the client 106 and/or manually generated by the user of the client 106.

In box 909, the user interface application 132 (FIG. 1) in the application 153 encodes a user interface for display on a viewing client 119, where the user interface provides a list of selectable media content 147.

In box 912, the user of the viewing client 119 may specify one or more sorting criteria for arranging the selectable media content 147 for selection purposes, where the sorting criteria may be derived by the analytics engine 127 (FIG. 1) from the uploaded data items 150 and presented to the viewer. The analytics engine 127 retrieves the sorting criteria, and in box 915, the analytics engine 127 determines a list order of the media content 147. In box 918, the user interface application 132 encodes an updated user interface that provides the selectable media content 147 according to the list order derived by the analytics engine 127.

Figure 10:
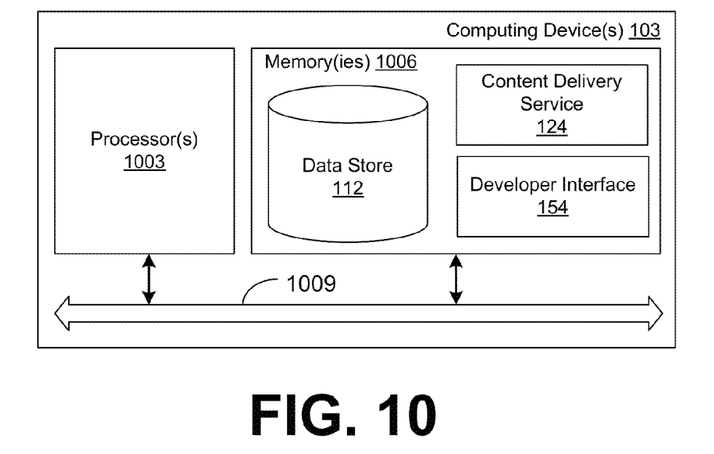
FIG. 10 is a schematic block diagram that provides one example illustration of a computing device employed in the networked environment of FIG. 1 according to various embodiments of the present disclosure.

With reference to FIG. 10, shown is a schematic block diagram of the computing device 103 according to an embodiment of the present disclosure. The computing device 103 includes at least one processor circuit, for example, having a processor 1003 and a memory 1006, both of which are coupled to a local interface 1009. To this end, the computing device 103 may comprise, for example, at least one server computer or like device. The local interface 1009 may comprise, for example, a data bus with an accompanying address/control bus or other bus structure as can be appreciated.

Stored in the memory 1006 are both data and several components that are executable by the processor 1003. In particular, stored in the memory 1006 and executable by the processor 1003 are the content delivery service 124, the developer interface 154, and potentially other applications. Also stored in the memory 1006 may be a data store 112 and other data. In addition, an operating system may be stored in the memory 1006 and executable by the processor 1003.

Figure 11:
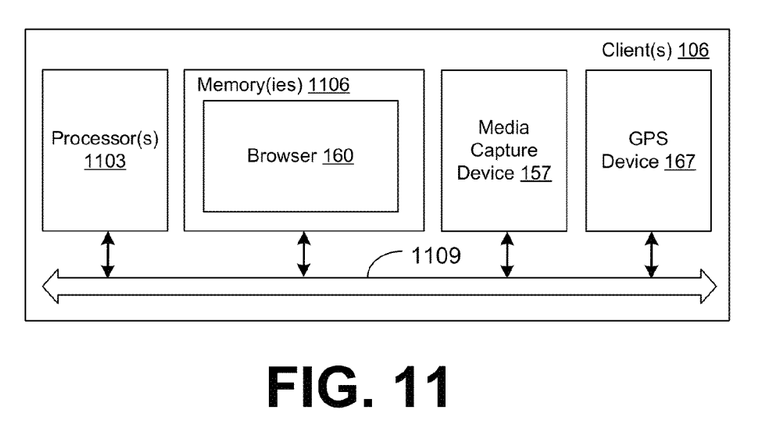
FIG. 11 is a schematic block diagram that provides one example illustration of a client device employed in the networked environment of FIG. 1 according to various embodiments of the present disclosure.

With reference to FIG. 11, shown is a schematic block diagram of the client device 106 configured to capture media content 147 (FIG. 1) according to an embodiment of the present disclosure. The client device 106 includes at least one processor circuit, for example, having a processor 1103 and a memory 1106, both of which are coupled to a local interface 1109. The client device 106 also includes a media capture device 157 and a GPS device 167, which are also coupled to the local interface 1109. To this end, the client device 106 may comprise, for example, at least one server computer or like device. The local interface 1109 may comprise, for example, a data bus with an accompanying address/control bus or other bus structure as can be appreciated.

Stored in the memory 1106 are both data and several components that are executable by the processor 1103. In particular, stored in the memory 1106 and executable by the processor 1103 are a browser and potentially other applications. In addition, an operating system may be stored in the memory 1106 and executable by the processor 1103.

It is understood that there may be other applications that are stored in each of the memories 1006/1106 and are executable by the respective processors 1003/1103 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the respective memories 1006/1106 and are executable by the processors 1003/1103. In this respect, the term "executable" means a program file that is in a form that can ultimately be run by a respective processor 1003/1103. Examples of executable programs may be, for example, a compiled program that can be translated into machine code in a format that can be loaded into a random access portion of a memory 1006/1106 and run by a processor 1003/1103, source code that may be expressed in proper format such as object code that is capable of being loaded into a random access portion of a memory 1006/1106 and executed by a processor 1003/1103, or source code that may be interpreted by another executable program to generate instructions in a random access portion of one of the memories 1006/1106 to be executed by a respective processor 1003/1103, etc.

An executable program may be stored in any portion or component of a respective memory 1006/1106 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Each of the memories 1006/1106 is defined herein as including both volatile and nonvolatile memory and data storage components. Volatile components are those that do not retain data values upon loss of power. Nonvolatile components are those that retain data upon a loss of power. Thus, each memory 1006/1106 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components.

In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each processor 1003/1103 may represent multiple processors and each memory 1006/1106 may represent multiple memories that operate in parallel processing circuits, respectively. In such a case, each local interface 1009/1109 may be an appropriate network 109 (FIG. 1) that facilitates communication between any two of the multiple processors, between any processor and any of the multiple memories, or between any two memories, etc. Such a local interface 1009/1109 may comprise additional systems designed to coordinate this communication, including, for example, performing load balancing. Each processor 1003/1103 may be of electrical or of some other available construction.

Although the applications including the content delivery service 124, the developer interface 154, and other various systems described herein may be embodied in software or code executed by general purpose hardware as discussed above, as an alternative the same may also be embodied in dedicated hardware or a combination of software/general purpose hardware and dedicated hardware.

If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 9 show an example of functionality of the content delivery service 124 and applications 153 (FIG. 1) within the developer interface 154. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1003/1103 in a computer system or other system. The machine code may be converted from the source code, etc. If embodied in hardware, each block may represent a circuit or a number of interconnected circuits to implement the specified logical function(s).

Although the flowcharts of FIGS. 2 and 9 show a specific order of execution, it is understood that the order of execution may differ from that which is depicted. For example, the order of execution of two or more blocks may be scrambled relative to the order shown. Also, two or more blocks shown in succession in FIGS. 2 and 9 may be executed concurrently or with partial concurrence. Further, in some embodiments, one or more of the blocks shown in FIGS. 2 and 9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content delivery service 124 and developer interface 154 that comprises software or code can be embodied in any non-transitory computer-readable medium for use by or in connection with an instruction execution system such as, for example, a processor in a computer system or other system. In this sense, each may comprise, for example, statements including instructions and declarations that can be fetched from the computer-readable medium and executed by the instruction execution system.

In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs.

Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
    code that identifies metadata associated with a plurality of video content received from at least one client device;
    code that extracts location data from the metadata;
    code that sorts and groups at least a portion of the plurality of video content into a grouping of content based at least in part on the location data;
    code that renders a user interface embodied as a map for display, the user interface including at least one item corresponding to the grouping of content, wherein the at least one item is positioned at a location on the map based at least in part on the location data;
    code that, in response to an input from a viewer for navigating the map, retrieves a selection of the grouping from the map;
    code that, in response to retrieving the selection of the grouping, determines a list order for the at least a portion of the plurality of video content of the grouping based at least in part on a sorting criterion; and
    code that encodes for display another user interface including the at least a portion of the plurality of video content of the grouping based at least in part on the list order.

2. The non-transitory computer-readable medium of claim 1, wherein the input from the viewer further comprises a panning operation or a zooming operation.

3. A system, comprising:
    at least one computing device; and
    at least one application executable in the at least one computing device, the at least one application comprising:
        logic that identifies a plurality of data items associated with a plurality of video content received from at least one client device, the plurality of data items including location data;
        logic that determines a grouping of at least a portion of the plurality of video content according to at least the location data; logic that encodes for display a user interface including the grouping;
        logic that, in response to retrieving a selection of the grouping in the user interface, determines a list order for the at least a portion of the plurality of video content of the grouping based at least in part on a sorting criterion; and
        logic that encodes for display another user interface including the at least a portion of the plurality of video content of the grouping based at least in part on the list order.

4. The system of claim 3, wherein the plurality of data items further include at least one of video resolution, audio quality, user identifier, or temporal data items.

5. The system of claim 3, wherein the location data comprises global positioning system (GPS) data corresponding to a current position of the at least one client device.

6. The system of claim 4, further comprising logic that retrieves account information based at least in part on the user identifier, wherein the account information includes a rating associated with a user.

7. The system of claim 3, wherein the sorting criterion is based at least in part on a highest rated user of the at least one client device down to a lowest rated user of the at least one client device.

8. The system of claim 3, wherein the sorting criterion is based at least in part on a number of faces detected within the at least a portion of the plurality of video content of the grouping.

9. The system of claim 8, wherein the logic that determines the grouping assigns content that contains a relatively higher number of faces a higher priority relative to content that contains a relatively lower number of faces.

10. The system of claim 3, wherein:
    the user interface comprises a map including at least one item corresponding to the grouping; and
    the at least one item is positioned at a location on the map based at least in part on the location data.

11. The system of claim 10, wherein the map comprises an exploded view of a region of interest selected by a user of a viewing device.

12. The system of claim 3, wherein the logic that identifies the plurality of data items is further configured to periodically identify at least one update of the plurality of data items.

13. The system of claim 3, further comprising logic that retrieves a video capture input from at least one viewing device, wherein the video capture input comprises a panning command or a zooming command.

14. A system, comprising:
    at least one computing device; and
    a developer application executable in the at least one computing device, the developer application comprising:
        logic that interfaces with a content delivery service and identifies a plurality of data items associated with a plurality of video content received from at least one client device, the plurality of data items including location data;
        logic that determines a grouping of at least a portion of the plurality of video content according to at least the location data;
        logic that encodes for display a user interface including the grouping;
        logic that, in response to retrieving a selection of the grouping in the user interface, determines a list order for the at least a portion of the plurality of video content of the grouping based at least in part on a sorting criterion; and
        logic that encodes for display another user interface including the at least a portion of the plurality of video content of the grouping based at least in part on the list order.

15. The system of claim 14, wherein the developer application interfaces with the content delivery service via one or more application programming interface (API) calls.

16. The system of claim 14, wherein the content delivery service is configured to interface with a plurality of other developer applications via one or more application programming interface (API) calls.

17. A method, comprising:
- interfacing with a content delivery service and identifying a plurality of data items associated with a plurality of video content received from at least one client device, the plurality of data items including location data;
- determining a grouping of at least a portion of the plurality of video content according to at least the location data;
- encoding for display a user interface including the grouping;
- determining, in response to retrieving a selection of the grouping in the user interface, a list order for the at least a portion of the plurality of video content of the grouping based at least in part on a sorting criterion; and
- encoding for display another user interface including the at least a portion of the plurality of video content of the grouping based at least in part on the list order.

18. The method of claim 17, wherein the interfacing comprises interfacing with the content delivery service via one or more application programming interface (API) calls.

19. The method of claim 17, wherein the content delivery service is configured to interface with a plurality of other developer applications via one or more application programming interface (API) calls.

20. The method of claim 17, wherein the sorting criterion is based at least in part on a highest rated user of at least one client device down to a lowest rated user of the at least one client device.

21. The system of claim 3, wherein the user interface includes at least one representative image corresponding to the grouping.

22. The system of claim 3, wherein the sorting criterion is based at least in part on a common event associated with the location data for the grouping.

23. The system of claim 3, wherein the another user interface includes the at least a portion of the plurality of video content in the grouping in a list format based at least in part on the sorting criterion.

* * * * *